UNITED STATES PATENT OFFICE.

ALBERT WALTER, OF ARDSLEY, NEW YORK.

MANUFACTURE OF CARBON BISULFID.

1,193,210.  Specification of Letters Patent.  Patented Aug. 1, 1916.

No Drawing. Application filed September 23, 1913, Serial No. 791,302. Renewed January 6, 1916. Serial No 70,702.

*To all whom it may concern:*

Be it known that I, ALBERT WALTER, citizen of the German Empire, and resident of Ardsley on Putnam, in the county of Westchester and State of New York, have invented certain new and useful Improvements in the Manufacture of Carbon Bisulfid, of which the following is a specification.

This invention relates to a process of manufacturing carbon bisulfid ($CS_2$), and the subject of the invention consists in improvements to avoid escaping of hydrogen-sulfid which, for instance, is formed in the retort process from the moisture of the sulfur and charcoal.

The invention consists in passing the hydrosulfuric gas over or through highly heated carbon (charcoal) which may be contained in a retort. The hydrogen sulfid is then decomposed and transformed into carbon bisulfid and hydrogen according to the equation: $2H_2S + C = CS_2 + 2H_2$.

The hydrogen which is freed may be used for heating the retort, or for other manufacturing purposes. If the hydrogen sulfid comes from a retort furnace where sulfur acts upon highly heated carbon for the manufacture of carbon bisulfid, the retort for the decomposition of the hydrosulfuric gas may be arranged in the same or in a separate furnace. It is evident that the output of carbon bisulfid is increased by the improved process, and the escaping of sulfur in form of hydrogen sulfid which is a poisonous gas avoided, or at least effectively decreased.

I claim:

1. The process of generating carbon bisulfid from hydrosulfuric acid (hydrogen sulfid) which consists in passing the latter through or over highly heated carbon.

2. The process of generating carbon bisulfid from hydrogen sulfid, evolved in a retort which is containing highly heated carbon and fed with sulfur, consisting in passing the hydrogen sulfid through a retort which contains highly heated carbon.

Signed at New York in the county of New York and State of New York this 20th day of Sept. A. D. 1913.

ALBERT WALTER.

Witnesses:
E. SCHMATOLLA,
H. SCHMATOLLA.